United States Patent
Moran

(10) Patent No.: US 9,969,100 B1
(45) Date of Patent: May 15, 2018

(54) FIRE RETARDANT COMPOSITION

(71) Applicant: Paul Moran, Lakewood, CO (US)

(72) Inventor: Paul Moran, Lakewood, CO (US)

(*) Notice: Subject to any disclaimer, the term of this patent is extended or adjusted under 35 U.S.C. 154(b) by 0 days. days.

(21) Appl. No.: 15/690,280

(22) Filed: Aug. 30, 2017

(51) Int. Cl.
| B27K 3/20 | (2006.01) |
| B27K 3/52 | (2006.01) |
| C09K 21/02 | (2006.01) |
| C09K 21/06 | (2006.01) |
| B27K 3/52 | (2006.01) |
| B27K 3/34 | (2006.01) |
| C09D 5/18 | (2006.01) |

(52) U.S. Cl.
CPC ............ B27K 3/20 (2013.01); B27K 3/34 (2013.01); B27K 3/52 (2013.01); C09D 5/18 (2013.01); C09K 21/02 (2013.01); C09K 21/06 (2013.01); *B27K 2240/30* (2013.01)

(58) Field of Classification Search
CPC ... B27K 3/20; B27K 3/34; B27K 3/52; B27K 2240/30; C09D 5/18; C09K 21/02; C09K 21/06

See application file for complete search history.

(56) References Cited

U.S. PATENT DOCUMENTS

| 4,107,376 A * | 8/1978 | Ishikawa | C04B 20/1055 428/305.5 |
| 6,641,649 B2 * | 11/2003 | John | C04B 18/023 106/18.12 |
| 7,652,087 B2 * | 1/2010 | Dimanshteyn | C09D 5/18 523/179 |
| 7,874,109 B2 * | 1/2011 | Stevenson | B32B 18/00 52/232 |
| 7,955,711 B2 * | 6/2011 | Castillo | A01N 59/00 162/24 |

FOREIGN PATENT DOCUMENTS

| CN | 104017438 A * | 9/2014 | ........... C09D 125/14 |
| KR | 10-0584160 B1 * | 5/2006 | ............. C04B 22/00 |

* cited by examiner

*Primary Examiner* — Anthony J Green
(74) *Attorney, Agent, or Firm* — Roger A. Jackson

(57) ABSTRACT

The present invention is a fire retardant composition for application to a porous article, the composition comprising by weight about; ten point seven-five percent (10.75%) sodium silicate; sixty-four point zero-six percent (64.06%) of a first water; zero point zero five percent (0.05%) soy flour; zero point five-five percent (0.55%) casein; seven point nine-three percent (7.93%) of a second water; zero point four percent (0.40%) starch; seven point nine-three percent (7.93%) of a third water; zero point four percent (0.40%) sodium metasilicate; and seven point nine-three percent (7.93%) of a fourth water.

15 Claims, No Drawings

FIRE RETARDANT COMPOSITION

RELATED PATENT APPLICATIONS

There are no related patent applications.

FIELD OF THE INVENTION

The present invention generally relates to a fire retardant composition that combines the typical fire retardant composition components of a sodium meta silicate and a sodium silicate that further comprises the components of soy flour and starch to help make the composition have the desirable qualities of better miscibility, better absorption, and adhesion to an article that the fire retardant is applied to, to assist in making that article more fire resistant.

DESCRIPTION OF THE RELATED ART

U.S. Pat. No. 7,652,087 to Dimanshteyn, et al. disclosed a coating composition consisting essentially of: (a) about 30 to about 65% by weight of a water-soluble alkali metal silicate binder; (b) about 0.1 to about 50% by weight of at least one inorganic particulate material which endothermically releases a nonflammable gas in the presence of heat; (c) about 0.1 to about 25% by weight of an inorganic filler for increasing the thermal stability and resistance of said composition to wear, as compared to a composition comprising (a), (b), and (d) in the absence of said inorganic filler; (d) about 1 to about 25% by weight of a polymeric binder; and (e) not more than about 1% by weight of a surfactant.

U.S. Pat. No. 7,874,109 to Stevenson, et al. disclosed a fireproof panel, comprising: a first ply of material including a first fiber material, the first ply of material having an exposed surface and an unexposed surface; a second ply of material including a second fiber material, the second ply of material having an exposed surface and an unexposed surface; a plurality of inner plies of material including a third fiber material impregnated with a matrix resin, the plurality of inner plies disposed between the first and second plies of material, the matrix resin adhering the plurality of inner plies of material to the unexposed surface of the first ply and the unexposed surface of the second ply; and a ceramic material impregnating at least a portion of the exposed surface of the first ply of material and at least a portion of the exposed surface of the second ply of material, the ceramic material formulated to resist loss of mechanical properties when exposed to temperatures of at least 1090 degree C.

U.S. Pat. No. 7,955,711 to Castillo, et al. disclosed an aqueous solution for the preservation of wood and wood products, the aqueous solution comprising: an alkali metal silicate comprising between about 5% and about 30% by mass of the solution and a soluble borate comprising between about 1.5% and about 9% by mass of the solution; and an alkali metal carbonate comprising between about 1% and about 10% by mass of the solution.

U.S. Pat. No. 4,107,376 to Ishikawa disclosed a heat-resistant composite comprising a noncombustible porous core material (e.g., a calcined mineral such as perlite, etc.) which has been impregnated or coated with an inorganic filler material (e.g., sodium metaborate, sodium meta silicate, sodium metaphosphate, etc.) capable of foaming spontaneously when heated at an elevated temperature. The composite in Ishikawa may be incorporated in a molded synthetic resin (e.g., polyurethane) to obtain a flame and heat-resistant molded article in the form of a panel useful as a building material, which, in turn, may be sandwiched between a facing material (e.g., a steel plate, plywood, etc.) and a backing material (e.g., aluminum foil, asbestos paper, etc.) to form a heat-resistant structure which is also useful as a building material. The composite in Ishikawa may also be formed by mixing and pelletizing at least one organic filler material with a clay (e.g., kaolin, bentonite, etc.) and incorporating this composite into a synthetic resin panel to obtain a flame and heat-resistant panel also suitable as a building material.

U.S. Pat. No. 6,641,649 to John, et al. disclosed an aqueous fire resistance treatment composition consisting of water, sodium silicate, a calcined filler and a latent acid catalyst is disclosed. The composition may be applied to cardboard substrates such as corrugated cardboard. The composition is then cured to provide enhanced fire resistance.

SUMMARY OF THE PRIOR ART

In conclusion, the above gives a sampling of an idea of the current state of the art in the fire retardant composition arts, wherein Dimanshteyn has a water soluble alkali metal silicate binder, an inorganic particulate that releases a non flammable gas when exposed to heat and a polymeric binder, all within a liquid application medium, Stevenson has sodium silicate and sodium meta silicate, see column 3, line 50, however, having a fiber/fabric medium, Castillo is a liquid application for wood preservation and fire retardant, having sodium meta silicate, Ishikawa has granules that are fire retardant (for mixing in substrates) having sodium meta silicate or sodium silicate, and John has sodium silicate, being a liquid for coating cardboard.

What is needed is a fire retardant composition that has improved miscibility, better absorption, and adhesion to the article that the fire retardant is applied to, through adding selected components being soy flour and starch that are not taught by the above prior art in combination with the sodium silicate and the sodium meta silicate, wherein the sodium silicate and sodium meta silicate are taught separately and together but not with soy flour and starch in the above prior art. Further needed disclosure would also include for the improved fire retardant composition, methods of making the composition, and a method of applying the composition to the article.

These and other objects of the present invention will become more readily appreciated and understood from a consideration of the following detailed description of the exemplary embodiments of the present invention.

SUMMARY OF INVENTION

Broadly, the present invention is of the fire retardant composition for application to a porous article, the composition comprising by weight about; ten point seven-five percent (10.75%) sodium silicate; sixty-four point zero-six percent (64.06%) of a first water; zero point zero five percent (0.05%) soy flour; zero point five-five percent (0.55%) casein; seven point nine-three percent (7.93%) of a second water; zero point four percent (0.40%) starch; seven point nine-three percent (7.93%) third water; zero point four percent (0.40%) sodium metasilicate; and seven point nine-three percent (7.93%) fourth water.

These and other objects of the present invention will become more readily appreciated and understood from a consideration of the following detailed description of the exemplary embodiments of the present invention.

DEFINITIONS

AGITATION 50—(MIXING) is when a velocity is created within the composition 60 via passing a blade through the composition 60 at a velocity greater that the composition 60 itself or alternatively via imparting movement to a composition 60 container at a velocity greater that the composition 60 itself.

CASEIN 55—Is from a family of related phosphoproteins that are commonly found in mammalian milk forming about eighty percent of the proteins in cow's milk being used as a cheese ingredient, food additive, and as a binder in compositions.

FIRE RETARDANT COMPOSITION 60—being the composition of the present invention.

FIRST WATER 65—Is water that is just distinguished as "first" to separate it out as a batch used at a certain point in the composition 60 and process of making the composition 60

FOURTH WATER 70—Is water that is just distinguished as "fourth" to separate it out as a batch used at a certain point in the composition 60 and process of making the composition 60

POUROUS ARTICLE 75—this is typically wood, but could also be fabric, or any other material that is capable of absorbing the composition 60 to have its fire retardant properties enhanced SECOND WATER 80—Is water that is just distinguished as "second" to separate it out as a batch used at a certain point in the composition 60 and process of making the composition 60

SODIUM METASILICATE 85—is a species of the sodium silicate 90 genus, sodium metasilicate 85 is also known as water glass or liquid glass, that is available in liquid or solid form typically as a white powder that is readily soluble in water, use is in cements, passive fire protection, textile and lumber processing, refractories, and automobiles.

SODIUM SILICATE 90—are a genus group of chemical compounds having the well known species of sodium metasilicate 85, sodium silicate 90 is also known as water glass or liquid glass, that is available in liquid or solid form that is readily soluble in water, use is in cements, passive fire protection, textile and lumber processing, refractories, and automobiles.

SOY FLOUR 95—Soy flour is derived from soybeans that are finely ground, wherein the soybean is roasted, removing the coat, and grinding into flours.

STARCH 100—a carbohydrate in human diets and found in potatoes, wheat, corn, rice, and the like. Starch is also converted into sugars by drying the grains for use in ethanol in beer, whisky, and biofuel, further starch is used as a thickening, stiffening, or gluing agent in compositions. The present invention preferably uses powered corn starch for the starch.

THIRD WATER 105—Is water that is just distinguished as "third" to separate it out as a batch used at a certain point in the composition 60 and process of making the composition 60

DETAILED DESCRIPTION

Broadly, the present invention is of the fire retardant composition 60 for application to the porous article 75, the composition 60 comprising by weight about; ten point seven-five percent (10.75%) sodium silicate 90; sixty-four point zero-six percent (64.06%) of the first water 65; zero point zero five percent (0.05%) soy flour 95; zero point five-five percent (0.55%) casein 55; seven point nine-three percent (7.93%) of the second water 80; zero point four percent (0.40%) starch 100; seven point nine-three percent (7.93%) third water 105; zero point four percent (0.40%) sodium metasilicate 85; and seven point nine-three percent (7.93%) fourth water 70.

Alternatively, for the fire retardant composition 60, wherein the starch 100 is preferably a powdered corn starch. Further, alternatively for the fire retardant composition 60, wherein the sodium silicate 90 is preferably a dry sodium silicate.

Another option for the fire retardant composition 60, wherein the sodium silicate 90 is modified to be a forty percent by weight solution in water forming a sodium silicate 90 solution that is about thirty-seven point five-nine percent (37.59%) by weight and the first water 65 is modified to be about thirty-seven point two-two percent (37.22%) by weight, as this is to have an option to use the standard forty percent sodium silicate solution 90 that is commercially available.

Continuing, for the method for making the fire retardant composition 60 for application to the porous article 75, the method comprising the steps of: firstly providing about ten point seven-five percent (10.75%) of sodium silicate 90 by weight of the concentrated batch total weight; secondly providing about sixty-four point zero-six percent (64.06%) of the first water 65 by weight of the concentrated batch total weight; thirdly providing about zero point zero five percent (0.05%) soy flour 95 by weight of the concentrated batch total weight; fourthly providing about zero point five-five percent (0.55%) casein 55 by weight of the concentrated batch total weight; fifthly providing about seven point nine-three percent (7.93%) of the second water 80 by weight of the concentrated batch total weight; sixthly providing about zero point four percent (0.40%) starch 100 by weight of the concentrated batch total weight; seventhly providing about seven point nine-three percent (7.93%) of the third water 105 by weight of the concentrated batch total weight; eighthly providing about zero point four percent (0.40%) sodium metasilicate 85 by weight of the concentrated batch total weight; and ninthly providing about seven point nine-three percent (7.93%) of the fourth water 70 by weight of the concentrated batch total weight.

Continuing for the method for making the fire retardant composition 60 for application to the porous article 75, a tenth step of heating the first water 65 to about one-hundred twenty degrees Fahrenheit to form a heated first water 65 then removing the heated first water 65 from the heating; an eleventh step of mixing the sodium silicate 90 and the heated first water 65 for a selected first time period until the sodium silicate 90 is dissolved in the heated first water 65 forming a first batch, wherein preferably the selected first time period is about forty-five minutes.

Next, for the method for making the fire retardant composition 60 for application to the porous article 75, a twelfth step of heating the second water 80 to about one-hundred twenty degrees Fahrenheit to form a heated second water 80 then removing the heated second water 80 from the heating; a thirteenth step of mixing the soy flour 95, the casein 55, and the heated second water 80 for a selected second time period until the soy flour 95 and the casein 55 are both dissolved in the heated second water 80 forming a second batch, wherein preferably the selected second time period is about forty-five minutes.

Further, for the for the method for making the fire retardant composition 60 for application to the porous article 75, a fourteenth step of heating the third water 105 to about ninety degrees Fahrenheit to form a heated third water 105 then removing the heated third water 105 from the heating; a fifteenth step of mixing the starch 100 and the heated third water 105 for a selected third time period until the starch 100 is dissolved in the heated third water 105 forming a third batch, wherein preferably the third selected time period is about forty-five minutes.

Next, for the method for making the fire retardant composition 60 for application to the porous article 75, a sixteenth step of heating the fourth water 70 to about one-hundred twenty degrees Fahrenheit to form a heated fourth water 70 then removing the heated fourth water 70 from the heating; seventeenth step of mixing the sodium metasilicate 85 and the heated fourth water 70 for a selected fourth time period until the sodium metasilicate 85 is dissolved in the heated fourth water 70 forming a fourth batch; wherein preferably the selected fourth time period is about forty-five minutes, and an eighteenth step of mixing the first, second, third, and fourth batches together for a selected fifth time period to form the concentrated batch, wherein the selected fifth time period is preferably about forty-five minutes.

As another option for the method for making a fire retardant composition 60, wherein the providing sodium silicate 90 step is modified to be a forty percent by weight solution in water forming a sodium silicate 90 solution that is about thirty-seven point five-nine percent (37.59%) by weight of a concentrated batch total weight, and the providing first water 65 step is modified to be about thirty-seven point two-two percent (37.22%) of a first water 65 by weight of the concentrated batch total weight, as this is to have an option to use the standard forty percent sodium silicate solution 90 that is commercially available.

A further option for the method for making a fire retardant composition 60 wherein the tenth, twelfth, fourteenth, and sixteenth steps of removing heating from the heated first 65, second 80, third 105, and fourth 70 waters further comprises a step of ambient environment cooling of each of the first 65, second 80, third 105, and fourth 70 waters to room temperature.

A continuing option for the method for making a fire retardant composition 60 is wherein the concentrated batch further comprises a step mixing in additional water in a nine to one volumetric ratio to the concentrated batch to form an application batch.

A method for applying the fire retardant composition 60 to the porous article 75, the method comprising the steps of: firstly providing an application batch of the fire retardant composition 60 that includes about ten point seven-five percent (10.75%) sodium silicate 90 by weight of a concentrated batch total weight, about sixty-four point zero-six percent (64.06%) of the first water 65 by weight of the concentrated batch total weight, about zero point zero five percent (0.05%) soy flour 95 by weight of the concentrated batch total weight, about zero point five-five percent (0.55%) casein 55 by weight of the concentrated batch total weight, about seven point nine-three percent (7.93%) of the second water 80 by weight of the concentrated batch total weight, about zero point four percent (0.40%) starch 100 by weight of the concentrated batch total weight, about seven point nine-three percent (7.93%) of the third water 105 by weight of the concentrated batch total weight, about zero point four percent (0.40%) sodium metasilicate 85 by weight of the concentrated batch total weight, providing about seven point nine-three percent (7.93%) of the fourth water 70 by weight of the concentrated batch total weight, to form the concentrated batch and adding water in a nine to one volumetric ratio to the concentrated batch to form the application batch.

Next, in the method for applying the fire retardant composition 60 to the porous article 75, a second step of providing the porous article 75, and a third step of applying the application batch to the article 75.

As an alternative for the method for applying the fire retardant composition 60 wherein the third applying step is preferably selected from the group consisting essentially of using a roller, a brush, spraying, pressure treating, and immersing for applying the fire retardant composition 60 to the porous article 75.

Another alternative for the method for applying the fire retardant composition 60 wherein the article 75 is kiln dried wood and further comprising a step of curing of the fire retardant composition 60 a selected time period per unit of wood thickness. Further to this alternative for the method for applying the fire retardant composition 60 wherein the step of curing further includes the selected time period being about one week per about one inch of wood thickness.

Continuing alternatively for the method for applying the fire retardant composition 60 wherein the article 75 is fabric and further comprising a step of curing of the fire retardant composition 60 a selected time period per unit of fabric thickness. Further to this alternative for the method for applying the fire retardant composition 60 wherein the article 75 is the fabric and further comprising a step of curing of the fire retardant composition 60 a selected time period per unit of fabric thickness is completed until the fire retardant composition 60 is dry.

Another alternative for the method for applying the fire retardant composition 60 wherein the providing firstly an application batch step that includes the sodium silicate 90 is modified to be a forty percent by weight solution in water forming a sodium silicate 90 solution that is about thirty-seven point five-nine percent (37.59%) by weight of the concentrated batch total weight, and the providing first water 65 step is modified to be about thirty-seven point two-two percent (37.22%) of the first water 65 by weight of the concentrated batch total weight, as this is to have an option to use the standard forty percent sodium silicate solution 90 that is commercially available.

A continuing alternative for the method for applying a fire retardant composition 60 wherein the providing firstly application batch step that includes the starch 100 is preferably a powdered corn starch.

Another alternative for the method for applying the fire retardant composition 60 wherein the providing firstly an application batch step that includes the sodium silicate 90 is preferably a dry sodium silicate.

The present invention of the fire retardant composition 60 is environmentally friendly, non-toxic, non-corrosive, and non-toxic.

CONCLUSION

Accordingly, the present invention of a fire retardant composition and methods for making and applying has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A fire retardant composition for application to a porous article, said composition comprising by weight about:
   (a) 10.75% sodium silicate and 64.06% of a first water;
   (b) 0.05% soy flour, 0.55% casein, and 7.93% of a second water;
   (c) 0.40% starch and 7.93% of a third water; and
   (d) 0.40% sodium metasilicate and 7.93% of a fourth water, combining (a), (b), (c), and (d) to form said fire retardant composition.

2. A fire retardant composition according to claim 1 wherein said starch is sourced as a powdered corn starch.

3. A fire retardant composition according to claim 1 wherein said sodium silicate is sourced as a dry sodium silicate.

4. A fire retardant composition according to claim 1 wherein said sodium silicate is modified to be sourced as a forty percent by weight solution in water.

5. A method for making a fire retardant composition for application to a porous article, said method comprising the steps of:
   (a) providing about 10.75% sodium silicate by weight of a concentrated batch total weight;
   (a) (i) providing about 64.06% of a first water by weight of said concentrated batch total weight;
   (b) providing about 0.05% soy flour by weight of said concentrated batch total weight;
   (b) (i) providing about 0.55% casein by weight of said concentrated batch total weight;
   (b) (ii) providing about 7.93% of a second water by weight of said concentrated batch total weight;
   (c) providing about 0.40% starch by weight of said concentrated batch total weight;
   (c) (i) providing about 7.93% of a third water by weight of said concentrated batch total weight;
   (d) providing about 0.40% sodium metasilicate by weight of said concentrated batch total weight;
   (d) (i) providing about 7.93% of a fourth water by weight of said concentrated batch total weight;
   (e) heating said first water to about 120° F. to form a heated first water then removing said heated first water from said heating;
   (e) (i) mixing said sodium silicate and said heated first water for a selected first time period until said sodium silicate is dissolved in said heated first water forming a first batch;
   (f) heating said second water to about 120° F. to form a heated second water then removing said heated second water from said heating;
   (f) (i) mixing said soy flour, said casein, and said heated second water for a selected second time period until said soy flour and said casein are both dissolved in said heated second water forming a second batch;
   (g) heating said third water to about 90° F. to form a heated third water then removing said heated third water from said heating;
   (g) (i) mixing said starch and said heated third water for a selected third time period until said starch is dissolved in said heated third water forming a third batch;
   (h) heating said fourth water to about 120° F. to form a heated fourth water then removing said heated fourth water from said heating;
   (h) (i) mixing said sodium metasilicate and said heated fourth water for a selected fourth time period until said sodium metasilicate is dissolved in said heated fourth water forming a fourth batch; and
   (i) mixing said first, second, third, and fourth batches together for a selected fifth time period to form said concentrated batch.

6. A method for making a fire retardant composition according to claim 5 wherein said providing sodium silicate step is modified to be sourced as a 40% by weight solution in water.

7. A method for making a fire retardant composition according to claim 5 wherein said steps of removing heating from said heated first, second, third, and fourth waters further comprises a step of ambient environment cooling said first, second, third, and fourth waters to room temperature.

8. A method for making a fire retardant composition according to claim 5 wherein said concentrated batch further comprises a step mixing in additional water in a nine to one volumetric ratio to said concentrated batch to form an application batch.

9. A method for applying a fire retardant composition to a porous article, said method comprising the steps of:
   (a) providing an application batch of said fire retardant composition that includes;
   (a) (i) about 10.75% sodium silicate by weight of a concentrated batch total weight, and about 64.06% of a first water by weight of said concentrated batch total weight,
   (a) (ii) about 0.05% soy flour by weight of said concentrated batch total weight, about 0.55% casein by weight of said concentrated batch total weight, about 7.93% of a second water by weight of said concentrated batch total weight,
   (a) (iii) about 0.40% starch by weight of said concentrated batch total weight, about 7.93% of a third water by weight of said concentrated batch total weight, and
   (a) (iv) about 0.40% sodium metasilicate by weight of said concentrated batch total weight, providing about 7.93% of a fourth water by weight of said concentrated batch total weight, combining (a) (i), (a) (ii), (a) (iii), and (a) (iv) to form a concentrated batch and adding water in a nine to one volumetric ratio to said concentrated batch to form said application batch;
   (b) providing a porous article; and
   (c) applying said application batch to said article.

10. A method for applying a fire retardant composition according to claim 9 wherein said applying step is selected from the group consisting of using a roller, a brush, spraying, pressure treating, and immersing.

11. A method for applying a fire retardant composition according to claim 10 wherein said article is kiln dried wood and further comprising a step of curing of said fire retardant composition.

12. A method for applying a fire retardant composition according to claim 10 wherein said article is a fabric and further comprising a step of curing of said fire retardant composition.

13. A method for applying a fire retardant composition according to claim 9 wherein said providing an application batch step that includes said sodium silicate is modified to be sourced as a 40% by weight solution in water.

14. A method for applying a fire retardant composition according to claim 9 wherein said providing an application batch step that includes said starch is sourced as a powdered corn starch.

15. A method for applying a fire retardant composition according to claim 9 wherein said providing an application batch step that includes said sodium silicate is sourced as a dry sodium silicate.

* * * * *